United States Patent [19]

Hattori

[11] Patent Number: 5,473,750

[45] Date of Patent: Dec. 5, 1995

[54] THREE-DIMENSIONAL COMPUTER GRAPHIC APPARATUS WITH DESIGNATED PROCESSING ORDER IN PIPELINE PROCESSING

[75] Inventor: Hiroshi Hattori, Kawasaki, Japan

[73] Assignee: Fujitsu Limited, Kawasaki, Japan

[21] Appl. No.: 157,413

[22] Filed: Nov. 26, 1993

[30] Foreign Application Priority Data

Nov. 26, 1992 [JP] Japan .................................. 4-317534

[51] Int. Cl.$^6$ ................................................. G06F 15/16
[52] U.S. Cl. .......................................... 395/163; 395/164
[58] Field of Search .................................. 395/162–166, 395/375, 250, 325, 425; 364/200

[56] References Cited

U.S. PATENT DOCUMENTS

| | | | |
|---|---|---|---|
| 4,876,644 | 10/1989 | Nuechterlein et al. | 364/200 |
| 5,392,393 | 2/1995 | Deering | 395/163 |

Primary Examiner—Mark R. Powell
Assistant Examiner—Kee M. Tung
Attorney, Agent, or Firm—Staas & Halsey

[57] ABSTRACT

In a three-dimensional computer graphic apparatus, a central processing unit functioning as a graphic data managing unit has a plurality of processor modules operatively connected to the central processing unit, each performing geometric conversion and pre-drawing processing of the graphic data and, further, outputting a synchronizing command. A distributor is operatively connected to the processor modules and a plurality of drawing processors is operatively connected to the distributor, each performing a drawing process based on the graphic data. A monitor is operatively connected to the drawing processors for displaying the graphic data. The distributor sequentially stores data, comprising the graphic data and a synchronizing command as output from the processor module, and outputs the graphic data when the selected data represents the graphic data and prohibits selection of the data, after the selection, when the selected data represents a synchronizing command, the prohibition of selection being released by the synchronizing command when all of the input data is in a state of prohibition of selection.

6 Claims, 11 Drawing Sheets

THREE-DIMENSIONAL COMPUTER GRAPHIC APPARATUS WITH DESIGNATED PROCESSING ORDER IN PIPELINE PROCESSING

BACKGROUND OF THE INVENTION

1. Field of the Invention

The present invention relates to a three-dimensional computer graphic apparatus having a function to designate a processing order of a plurality of graphic data which are output from a plurality of parallel processing units, for example, processor modules connected in parallel, which are included in the apparatus.

2. Description of the Related Art

In general, in a three-dimensional computer graphic apparatus, it is necessary to carry out the following steps of converting a three-dimensional model (i.e., object) into a two-dimensional image to be displayed on the apparatus. First, a viewpoint and light source are determined on the three-dimensional model. Second, the graphic data are determined from the three-dimensional model in accordance with the viewpoint and light source. Third, geometric conversion is carried out for the graphic data in the apparatus. The geometric conversion includes an ordinate calculation, clipping operation, color density calculation, etc.

Further, after geometric conversion, a predrawing process, for example, a span-generation process, is carried out on the result of each geometric conversion. Finally, after the pre-drawing process, a drawing process, for example, a spanning and an erasing process, is carried out on the result of the pre-drawing process. As a result, the graphic data of the three-dimensional model is converted to a two-dimensional image to be displayed on the apparatus in accordance with the viewpoint.

In this structure, for example, the processor module is used for the geometric conversion and the pre-drawing process, and the processor module is used for the drawing process.

In order to carry out the above processes at high speed, in general, the apparatus includes a plurality of parallel processing units, for example, processor modules connected in parallel. The processor modules are formed of pipeline structures, and the graphic data are sequentially processed in parallel passing through each pipeline.

In the pipeline processing mentioned above, it is impossible to designate a processing order of the graphic data. This is because data from each pipeline are sequentially processed in parallel for every data train. That is, when detecting a break in the data train, a next data train is sequentially processed in parallel for another pipeline without any designation from an operator.

Accordingly, if the operator wishes to designate a processing order of the graphic data, it is necessary to make one pipeline operate, so as to carry out a designation of the processing order, and to temporarily stop other pipeline processing. As a result of the above designation, a problem occurs in that the throughput of the overall apparatus deteriorates.

SUMMARY OF THE INVENTION

The object of the present invention is to provide a three-dimensional computer graphic apparatus having a function to designate a processing order of a plurality of graphic data which are output from a plurality of parallel processing units, for example, processor modules connected in parallel, which are included in the apparatus.

In accordance with the present invention, there is provided a three-dimensional computer graphic apparatus including: a central processing unit CPU used as a graphic data managing unit; a plurality of processor modules operatively connected to the central processing unit and each performing geometric conversion and a predrawing process of the graphic data, and further outputting a synchronizing command; a distributor operatively connected to the processor modules; a plurality of drawing processors operatively connected to the distributor and each performing a drawing process based on the graphic data; and a monitor operatively connected to the drawing processors for displaying the graphic data.

The distributor further includes a plurality of first-in first-out buffers (input FIFOs) each connected to a corresponding processor module for sequentially storing data consisting of the graphic data and the synchronizing command, both output from the processor module; a plurality of first-in first-out buffers (output FIFOs) each connected to corresponding drawing processors for sequentially storing the graphic data; and a selection distributing unit provided between the input FIFOs and output FIFOs for selecting one of the data from the input FIFO, outputting the graphic data to the output FIFO when the selected data represents the graphic data, prohibiting selection of the data from a corresponding input FIFO after above selection when the selected data represents the synchronizing command, and releasing prohibition of selection by the synchronizing command when all input FIFOs enter a state where selection is prohibited.

In a preferred embodiment, the selection distributing unit includes: a switch/selection unit and a decision/switch unit; the switch/selection unit having a multiplexer for selectively outputting the data from the input FIFO and a destination selecting unit for distributing the graphic data to one or more output FIFO; and the decision/switch unit having a synchronizing command decision unit for outputting a selection prohibiting signal based on a control signal from the CPU, a command analyzing unit for outputting the synchronizing command to the decision unit, an input selecting unit for receiving the selection prohibiting signal and outputting an input control signal to the multiplexer, an output control unit for receiving the data from the multiplexer and outputting a destination control signal to the destination selecting unit, and an input data decision unit for receiving the data from the input FIFOs.

In another preferred embodiment, the decision/switch unit further includes a control register provided between the CPU and the decision unit for storing bits, each indicating an in-use/not in-use state of the processor module, and the decision unit generates the selection prohibiting signal when receiving a "not in-use" signal from the control register sent to the input selecting unit.

In still another embodiment, the control register has a number of bits corresponding to the number of processor modules.

In still another embodiment, "in-use" is indicated by the bit "0" and "not in-use" is indicated by the bit "1".

In still another embodiment, when one of the processor modules becomes faulty, the distributor appears to output a dummy synchronizing command from the faulty processor module.

DESCRIPTION OF THE PREFERRED EMBODIMENTS

The feature of the present invention lies in a synchronizing command used for designation of the processing order. Further, the feature of the present invention lies in a method of controlling the processing order of the graphic data in the pipeline processing. As a result of this designation, it is possible to achieve realistic images on the display.

This control is carried out only when a user intends to designate the processing order of the pipeline processing by using a particular command. In the present invention, this particular command is called a "synchronizing command" below. This means that the particular pipeline processing is carried out in synchronization with another pipeline processing.

As explained in detail below, when a distributor (see, FIG. 11) receives the synchronizing command from the processor module, the distributor does not process the data which is already input from the processor module to the distributor, and searches for the next data which is already input. Then, when the distributor receives synchronizing commands from all processor modules, the distributor releases all synchronizing commands and returns to a normal processing order to process the next graphic data from the processor module. In accordance with above simple procedures, it is possible to designate the processing order of the pipeline processing.

Figure 1:
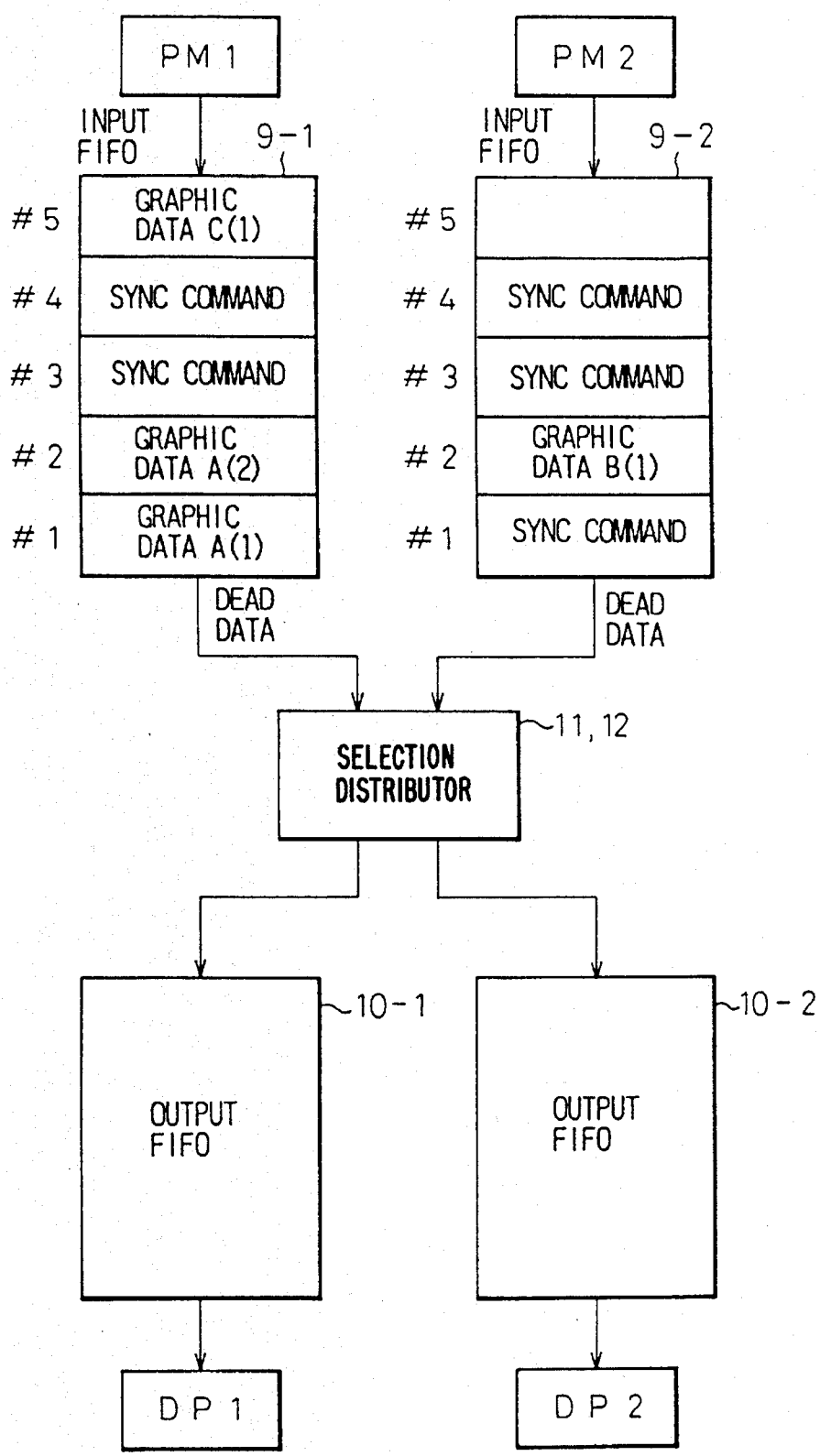
FIG. 1 is an explanatory view explaining a principle of the present invention.

FIG. 1 is an explanatory view explaining a principle of the present invention. In FIG. 1, reference numbers 1—1 and 1–2 denote input first-in first-out buffers (below, input FIFO), and reference numbers 10-1 and 10-2 denote output first-in first-out buffers (below, output FIFO). Further, reference numbers 11, 12 denote selection distributing means ("SEL/DIST"). As mentioned above, PM1 and PM2 denote processor modules, and DP1 and DP2 denote drawing modules. The input FIFOs 9-1 and 9-2, the output FIFOs 10-1 and 10-2 and the selection distributing means 11, 12 are provided in the distributor means 4 in FIG. 11.

As shown in FIG. 1, there are two processor modules PM1 and PM2, two input FIFOs, one selection distributing means 11, 12, and two output FIFOs. The graphic data or the synchronizing command from the processor module PM1 is sequentially stored, from an address #1 to the address #5, in the input FIFO 9-1 and the graphic data or the synchronizing command from the processor module PM2 is sequentially stored, from the address #1 to the address #5, in the input FIFO 9-2. Accordingly, each input FIFO stores the graphic data or the synchronizing command(s). The read data (i.e., the graphic data or the synchronizing command) from the input FIFOs 9-1 and 9-2 are sent to the selection distributing means 11, 12. The selection distributing means detects the read data, and selectively sends the graphic data to the corresponding output FIFO as explained in detail below.

The selection distributing means 11, 12 selects one read data (i.e., output data from each input FIFO). When the selected output data represents the graphic data, the selection distributing means 11, 12 sends the same to the output FIFO. When the selected output data represents the synchronizing command, after this selection, the selection distributing means 11, 12 prohibits selection of the output data from a corresponding input FIFO.

When all read data represent the synchronizing command, all input FIFOs enter a prohibition state. In this state, the selection distributing means 11, 12 releases all synchronizing commands, and returns to the normal operation. The above operation is explained in detail below.

Figure 10:
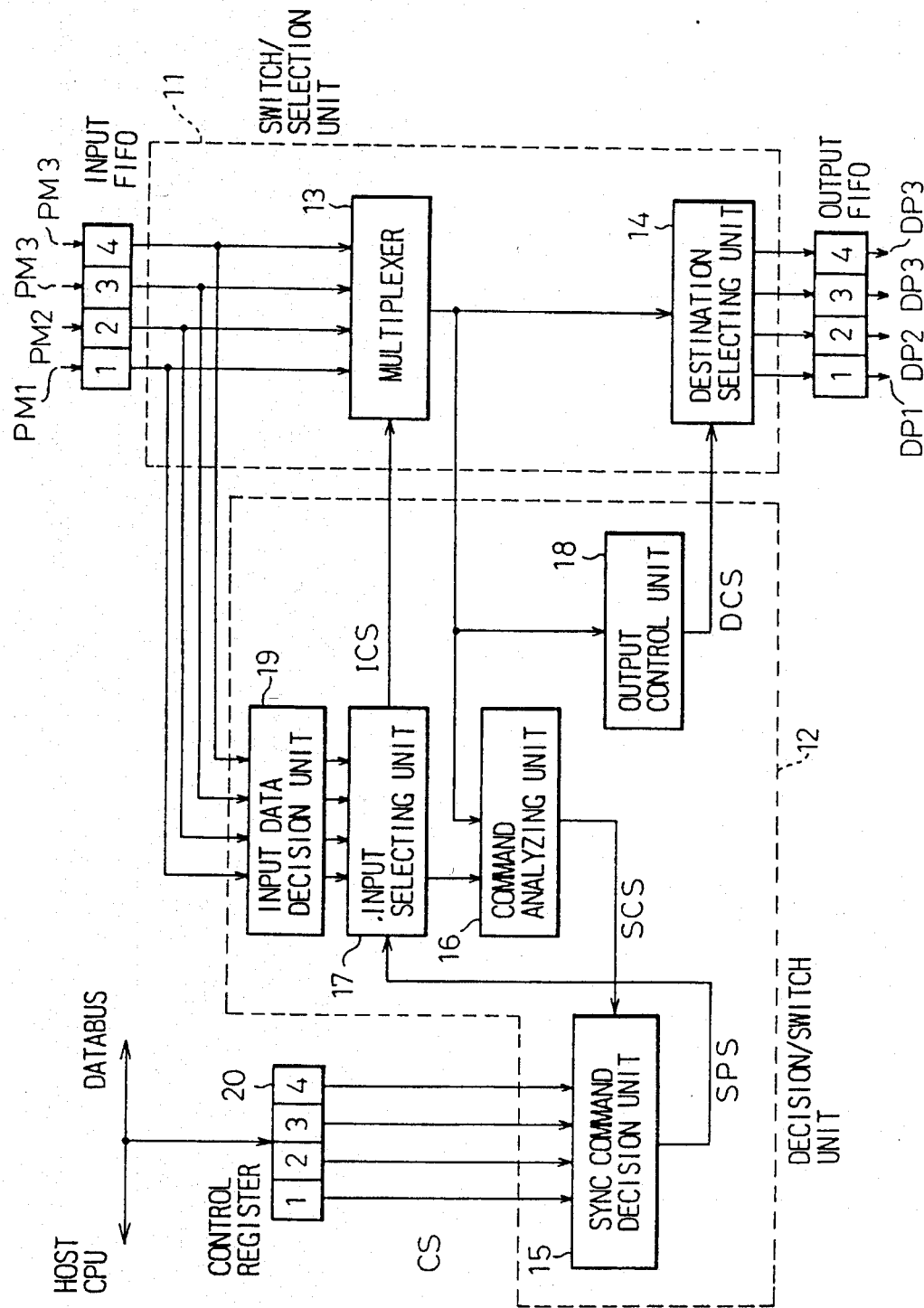
FIG. 10 is a detailed block diagram of units 11 and 12 according to the present invention.

Further, as another embodiment of the present invention, a control register is provided between a host computer and a decision/switch unit 12 (see, FIG. 10). The control register temporarily stores bits (four bits in this embodiment) indicating an in-use/not in-use state of the processor module. When the bit indicates not in-use (for example "1"), the selection distributing means 11, 12 prohibits selection of the read data of the input FIFO which corresponds to that processor module.

The operation of the selection distributing means will now be explained briefly with respect to FIG. 1. In FIG. 1, #1 to #5 denote addresses in each input FIFO.

First, the selection distributing means 11, 12 selects the graphic data A(1) of the address #1 which is output from the input FIFO 9-1. When selection is completed, a read pointer (not shown) of the input FIFO 9-1 is incremented by +1, and the graphic data A(2) of the address #2 is output from the input FIFO 9-1. The selected graphic data A(1) is sent to the output FIFO 10-1 or 10-2.

Next, the selection distributing means 11, 12 selects the synchronizing command of the address #1 which is output from the input FIFO 9-2. When the selection is finished, the read pointer of the input FIFO 9-2 is incremented by +1, and the graphic data B(1) of the address #2 is output from the input FIFO 9-2. In this case, since the selected output represents the synchronizing command, after this selection, the selection distributing means does not select the output of the input FIFO 9-2. That is, the input FIFO 9-2 enters a selection prohibiting state.

Next, the selection distributing means 11, 12 selects the graphic data A(2) of the address #2 which is output from the input FIFO 9-1. When selection is finished, the read pointer of the input FIFO 9-1 is incremented by +1, and the synchronizing command of the address #3 is output from the input FIFO 9-1. The selected graphic data A(2) is sent to either the output FIFO 10-1 or the output FIFO 10-2.

Next, the selection distributing means 11, 12 selects the synchronizing command of the address #3 which is output from the input FIFO 9-1. When selection is finished, the read pointer of the input FIFO 9-1 is incremented by +1, and the synchronizing command of the address #4 is output from the input FIFO 9-1. Since the selected output represents the synchronizing command, after this selection, the selection distributing means prohibits selection of the output of the input FIFO 9-1. That is, the input FIFO 9-1 enters a selection prohibiting state.

Since both input FIFOs 9-1 and 9-2 enter a selection prohibiting state, further, the selection distributing means 11, 12 releases the synchronizing commands to stop the prohibiting state.

At this time of release, it is assumed that the input FIFO 9-2 has a priority of selection which is higher than that of the input FIFO 9-1. The selection distributing means 11, 12 thus selects the graphic data B(1) of the address #2 which had been output from the input FIFO 9-2. When the selection is finished, the read pointer of the input FIFO 9-2 is incremented by +1, and the synchronizing command of the address #3 is output from the input FIFO 9-2. The selected graphic data B(1) is sent to either the output FIFO 10-1 or the output FIFO 10-2.

Next, the selection distributing means 11, 12 selects the synchronizing command of the address #4 which is output from the input FIFO 9-1. When selection is finished, the read pointer of the input FIFO 9-1 is incremented by +1, and the graphic data of the address #5 is output from the input FIFO 9-1. Since the selected output represents the synchronizing command, after this selection, the selection distributing means 11, 12 does not select the output of the input FIFO 9-1. That is, the input FIFO 9-1 enters a selection prohibiting state.

Next, the selection distributing means 11, 12 selects the synchronizing command of the address #3 which is output from the input FIFO 9-2. When the selection is finished, the read pointer of the input FIFO 9-2 is incremented by +1, and the synchronizing command of the address #4 is output from the input FIFO 9-2. Since the selected output represents the synchronizing command, after this selection, the selection distributing means does not select the output of the input FIFO 9-2. That is, the input FIFO 9-2 enters a selection prohibiting state.

Again, since both input FIFOs 9-1 and 9-2 enter a selection prohibiting state, the selection distributing means releases the synchronizing commands to stop this prohibiting state.

At this time of release, it is assumed that the input FIFO 9-1 has priority of selection higher than the input FIFO 9-2. The selection distributing means 11, 12 selects the graphic data C(1) of the address #5 which is output from the input FIFO 9-1. The selected graphic data C(1) is sent either the output FIFO 10-1 or the output FIFO 10-2.

Further, as explained above, when the control register indicates the processor module PM2 is not in-use, the input FIFO 9-2 enters a selection prohibiting state, and the selection distributing means 11, 12 selects the output of the input FIFO 9-1.

Figure 2:
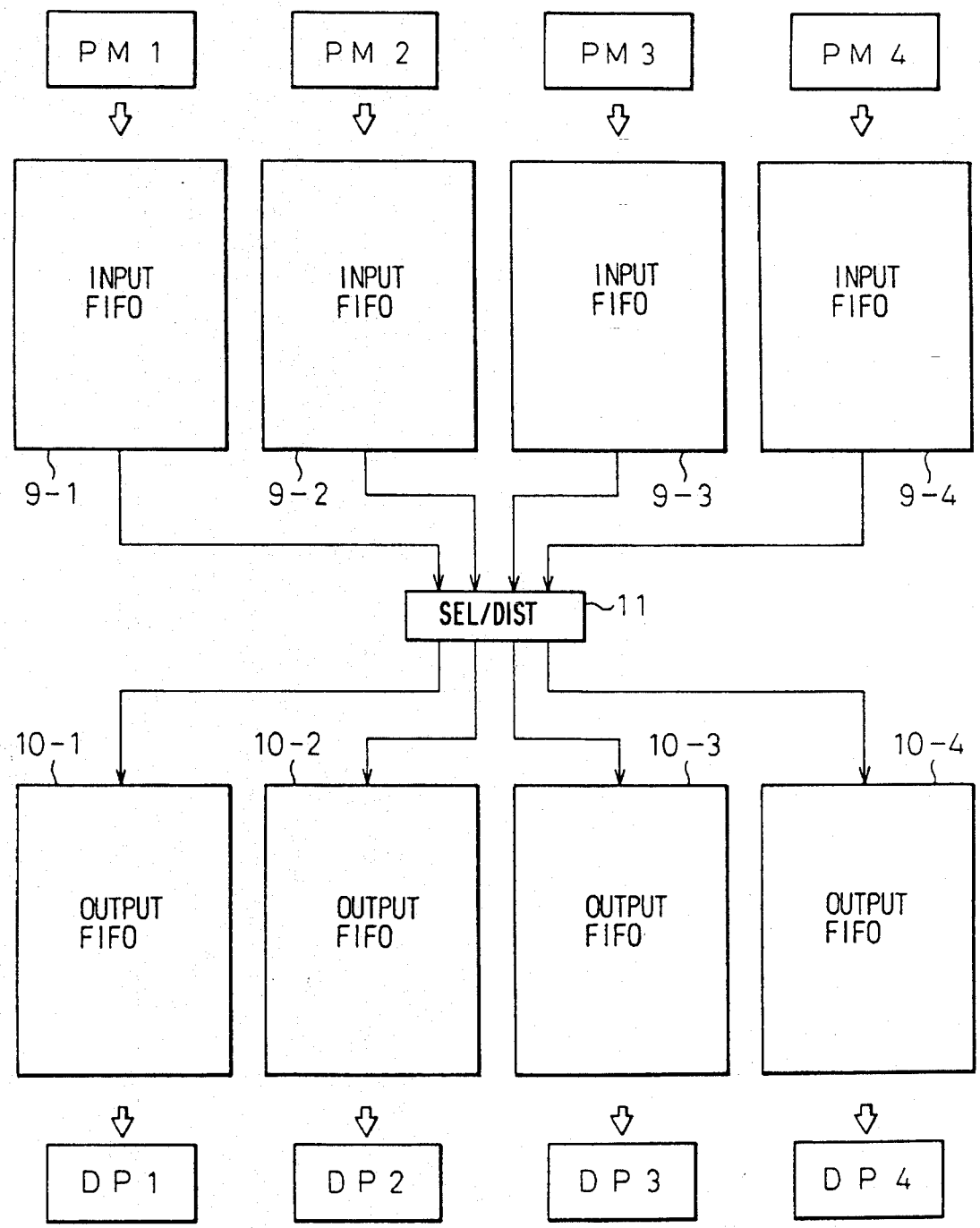
FIG. 2 is a schematic block diagram of a distributor according to one embodiment of the present invention.

FIG. 2 is a schematic block diagram of a distributor according to one embodiment of the present invention. As shown in FIG. 2, the distributor is formed by four input FIFOs 9-1 to 9-4, four output FIFOs 10-1 to 10-4, and the switch/selection unit 11 which is provided between the input FIFOs and the output FIFOs. The pipeline processing is utilized for the operation of this distributor.

The switch/selection unit 11 briefly operates as follows. It is assumed that "n" (n=4, in this embodiment) inputs are provided as the number of inputs to the switch/selection unit 11. The switch/selection unit 11 takes "n+1" states, i.e., a state of waiting for the input, a state of reading the input No. 1, a state of reading the input No. 2, . . . , and a state of reading the input No. n. The priority order of these states is previously determined in the switch/selection unit 11.

In the state of waiting for the input, the priority order is given by the input No. 1>No. 2 >. . .>No. n. That is, the smaller the input number, the higher the priority order. Accordingly, the smaller input number is selected when many inputs are provided to the switch/selection unit 11. In this case, the input No. 1 is selected as a next connection.

In the state of reading the input No. 1, the priority order is given by the input No. 2>No.3>. . . >No. n>No. 1. In this case, the input No. 1 which is connected to the switch/selection unit 11 has the lowest priority, and the input No. 2 is selected as a next connection.

The connection of the input is carried out in accordance with the above priority order. Accordingly, it is impossible to change the priority order of the input data so that it is impossible to designate a particular processing order which ignores the priority order in the above steps. If the operator wishes to designate a particular processing order, for example, if the operator wishes to first deal with the input No. 4, only the input No. 4 is connected to the switch/selection unit 11 and other inputs are prohibited. However, this method has a drawback in that it deteriorates the throughput of the apparatus since only one pipeline processing is carried out.

To solve the above problems, the synchronizing command is used in the present invention as explained in relation to FIG. 1. When the synchronizing command is input from a processor module PM to the switch/selection unit 11, the switch/selection unit 11 does not select the read data from the same input FIFO. That is, since the switch/selection unit 11 receives the synchronizing command, the read data from the same input FIFO is not selected the next time. Accordingly, it is possible to easily connect only the designated read data so that it is possible to easily designate the particular processing order. When all data from the input FIFO become the synchronizing commands, the switch/selection unit 11 shifts to the state of waiting for the read data, and starts to process next read data.

Figure 3:
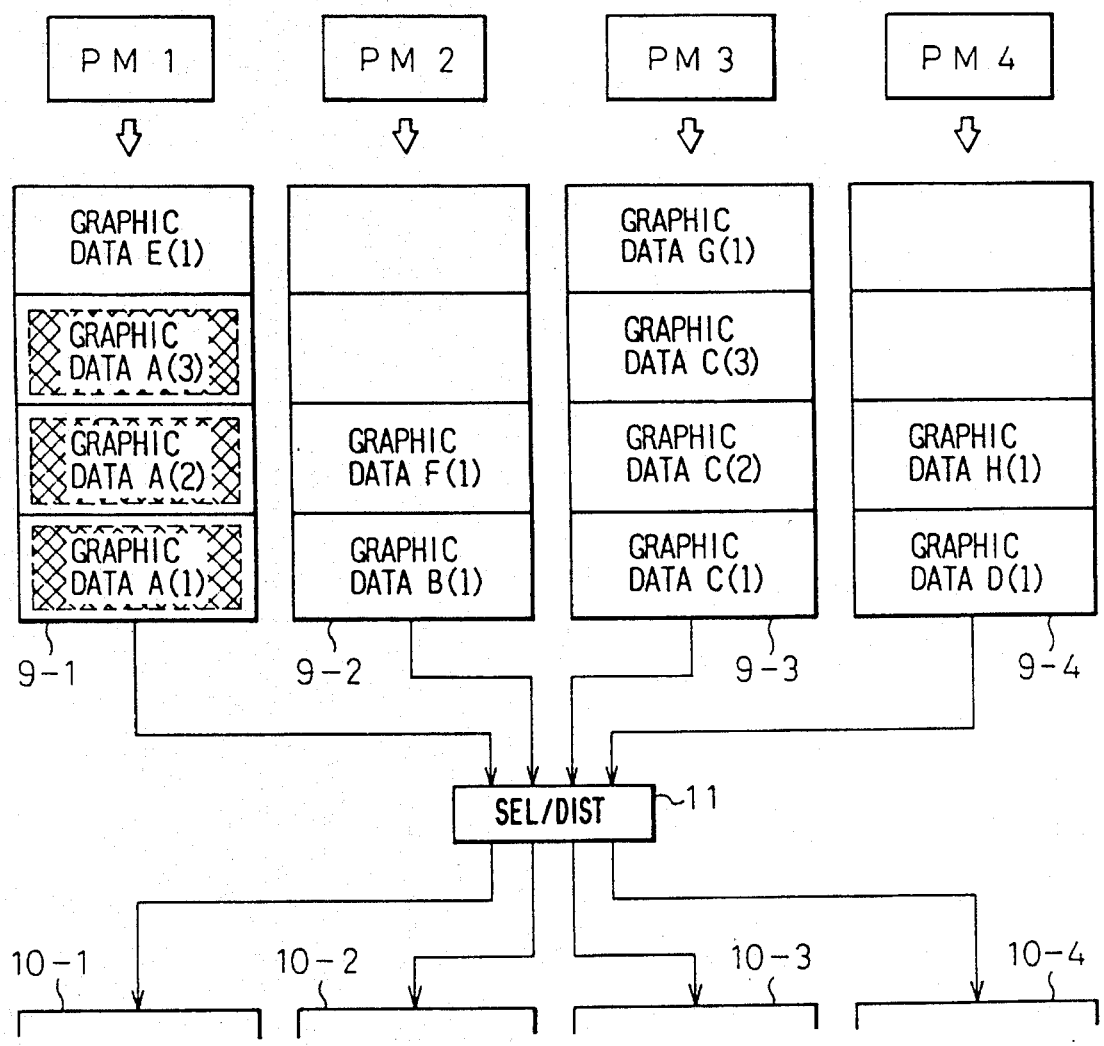
FIG. 3 shows one example of data input to each input FIFO in a normal operation.

FIG. 3 shows one example of data input to each input FIFO in a normal operation. The synchronizing commands are not used in the normal operation. Each input FIFO 9-1 to 9-4 stores various graphic data as shown in the drawing. That is, there are no synchronizing commands in any input FIFOs. Although graphic data A(1) to A(3) represent data of one graphic object, these data are separated into three portions as shown by the input FIFO 9-1. The switch/selection unit 11 receives these data sequentially from the processor modules PM1 to PM4, and sends them to the output FIFOs 10-1 to 10-4 as explained in FIG. 4.

Figure 4:
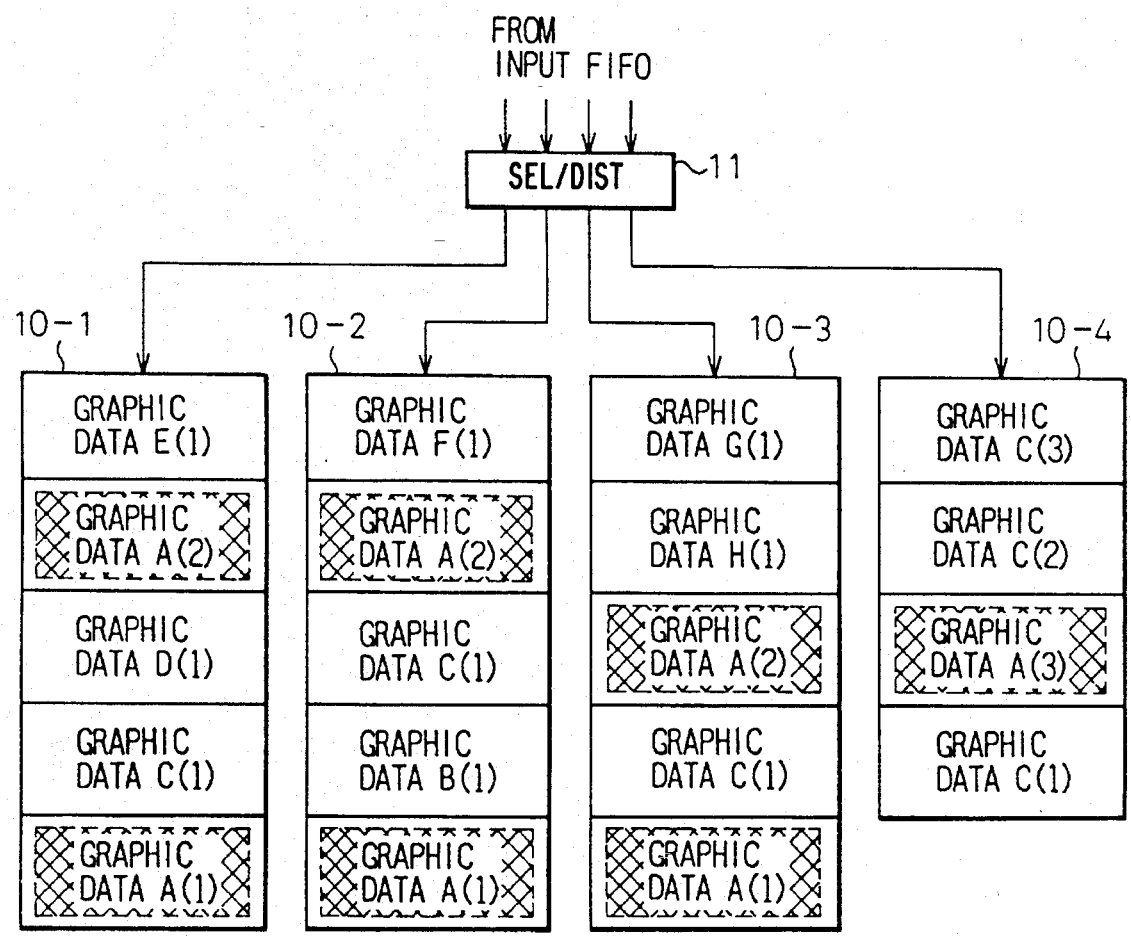
FIG. 4 is an explanatory view of a distributing operation in a normal operation.

FIG. 4 is an explanatory view of a distributing operation in the normal operation. In FIG. 4, the output FIFOs 10-1 to 10-4 store various graphic data in accordance with the result of distribution by the switch/selection unit 11.

Figure 11:
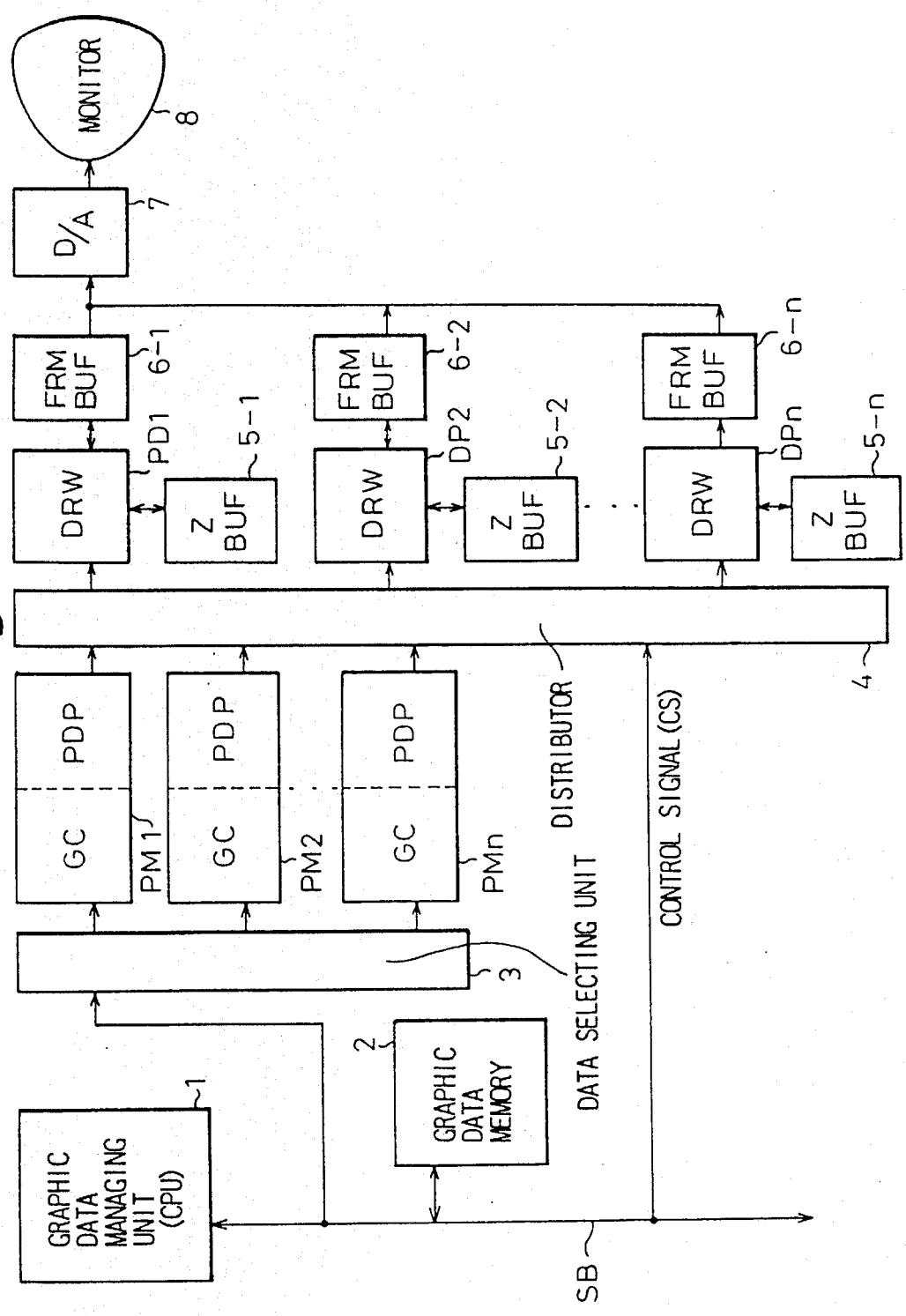
FIG. 11 is a schematic block diagram of a three-dimensional computer graphic display apparatus using the present invention.

That is, the switch/selection unit 11 sequentially distributes the graphic data from the output FIFO 10-1 to output FIFO 10-4. The graphic data in each output FIFO is sequentially sent to a corresponding drawing processor as shown in FIG. 11. Accordingly, since the synchronizing command is not included, the graphic data managing unit 1 (a host computer CPU, in FIG. 11) cannot designate the processing order.

Figure 5:
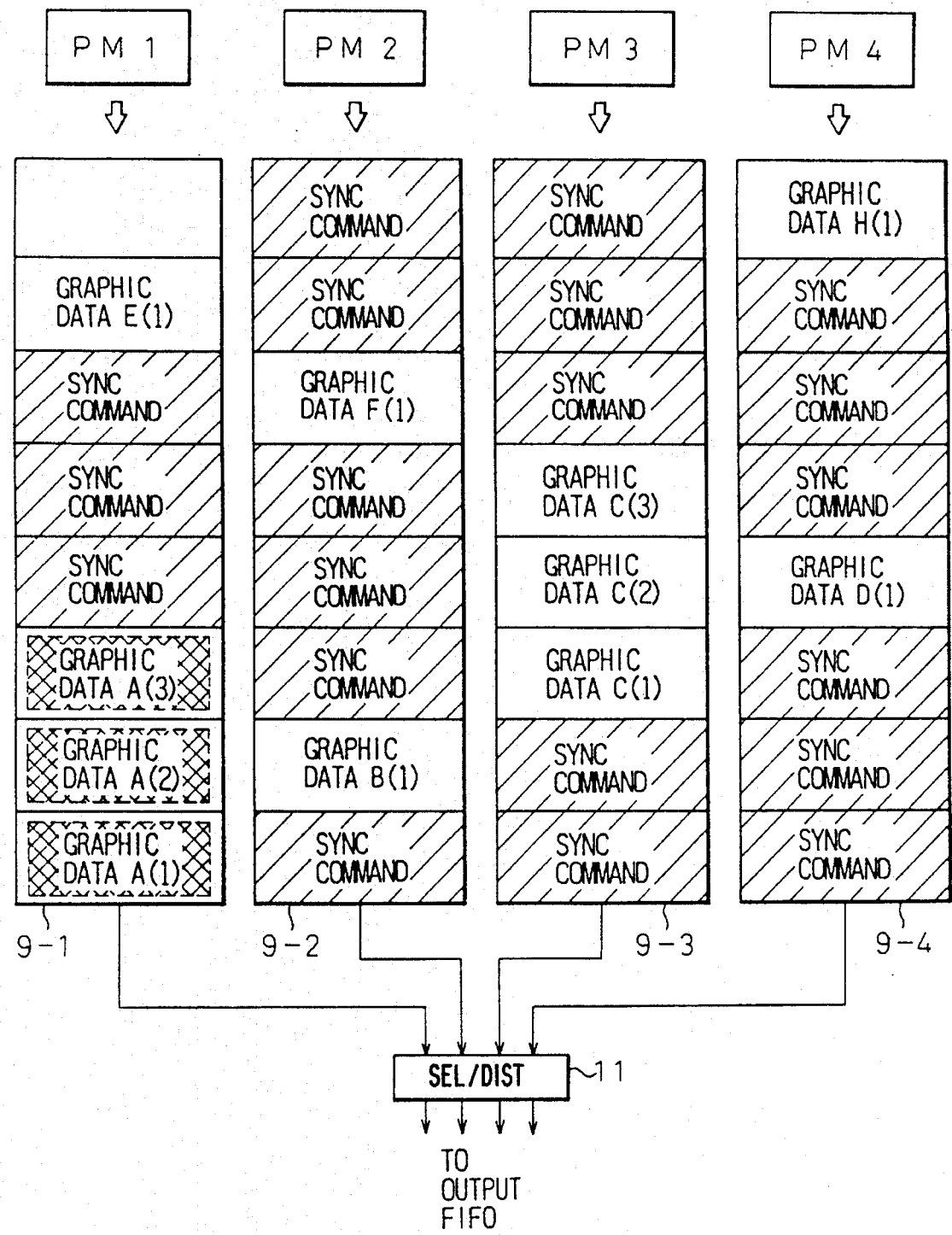
FIG. 5 shows one example of input data including synchronizing commands.

FIG. 5 shows one example of input data including synchronizing commands. In the drawing, slant portions represent the synchronizing (SYNC) command, and other portions represent the graphic data. For example, the input FIFO 9-1 stores three graphic data A(1) to A(3) which require processing at the same time, three synchronizing commands, and the graphic data E(1).

The synchronizing command is inserted as follows. For example, it is assumed that the graphic data A(1) to A(3) of the input FIFO 9-1 (i.e., data from processor module PM1) represent one graphic object and these graphic data must be processed by only one (i.e., a single) process. Accordingly, as shown in the drawing, to carry out this process, the synchronizing commands are provided for the processor modules PM2, PM3 and PM4. Further, for the graphic data B(1), the synchronizing commands are provided for the processor modules PM1, PM3 and PM4.

When the particular graphic data, for example, the above data A(1) to A(3), necessitates the above process by using the synchronizing command, the host computer (graphic data management unit 1 in FIG. 11) instructs each processor module PM so as to output the synchronizing command. Accordingly, the processor module PM generates the synchronizing command in the form possible to analyze in the distributor.

Comparing FIG. 5 with FIG. 3, an amount of data of FIG. 5 appears to be considerably increased compared to that of FIG. 3. However, in actuality, the graphic data is formed in the range of from fifteen or sixteen to several tens of words, and the synchronizing command is formed by one word. Accordingly, only a several percent increase may be realized based on the synchronizing command. In general, the graphic data is formed by a graphic command, a data length, and various parameters for defining the graphic data. The operation of FIGS. 5 and 6 will be explained in detail in FIG. 10.

Figure 6:
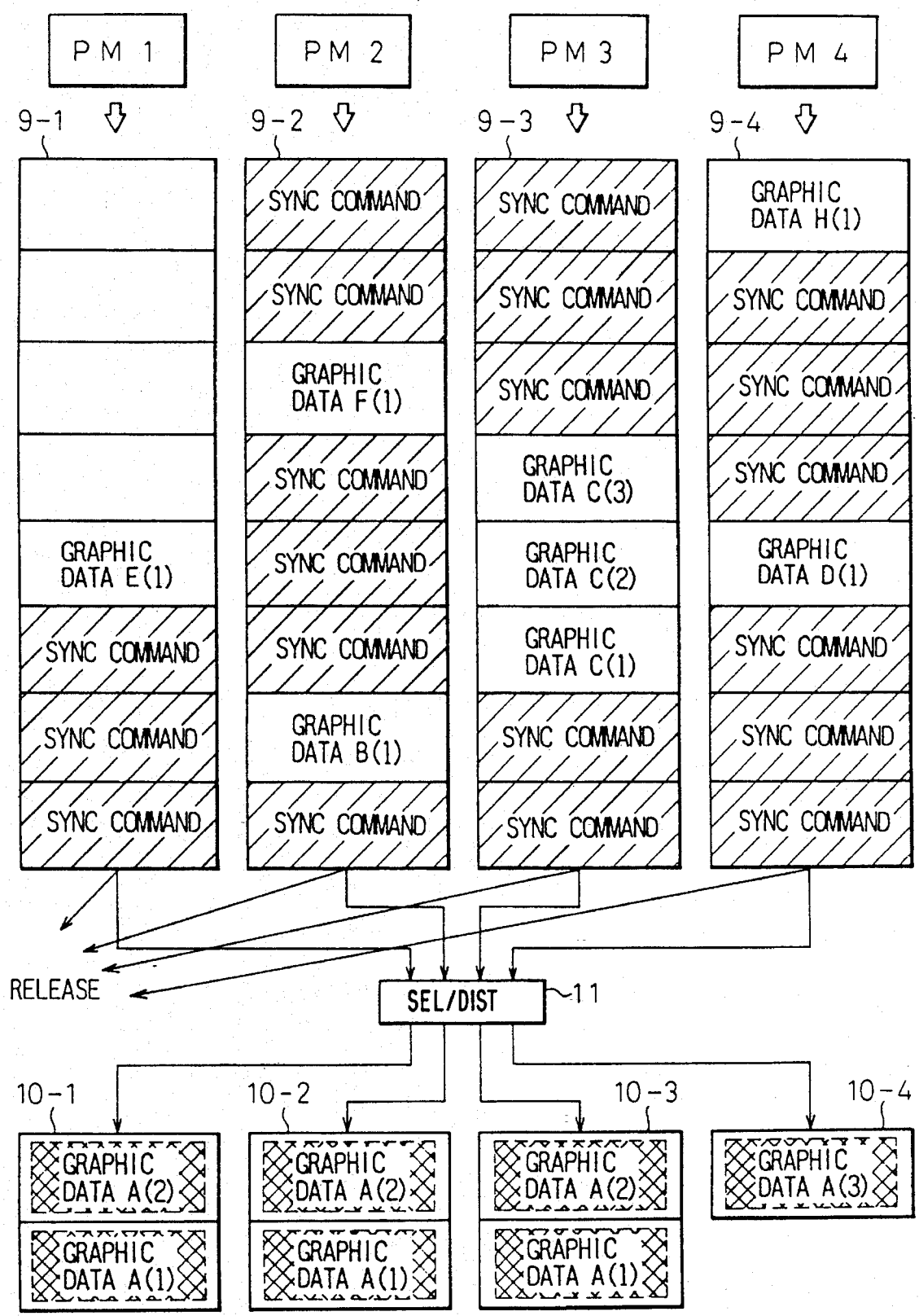
FIG. 6 is an explanatory view of output data with the use of synchronizing commands.

FIG. 6 is an explanatory view of output data in the output FIFO using synchronizing commands. This drawing shows the output process. The data in the input FIFO of FIG. 5 are distributed to each output FIFO as shown in the drawing. The input from the input FIFO 9-1 is selected, and the inputs from the input FIFOs 9-2 to 9-4 are not selected because of the synchronizing command. The graphic data A(1) to A(3) are stored in the output FIFOs 10-1 to 10-5, respectively as shown in FIG. 6. These steps are continued until the synchronizing commands are found in the input FIFO 9-1. The operation of FIGS. 5 and 6 is explained in detail in FIG. 10.

When all inputs have the synchronizing command, all synchronizing commands are released and the next input is selected. That is, in the next step, since the input FIFO 9-1, the input FIFO 9-3 and the input FIFO 9-4 all have the synchronizing command, only the graphic data B(1) is selected.

After the graphic data B(1) is processed, all inputs have the synchronizing commands so that all synchronizing commands are released and the next input is selected. That is, in a next step, since the input FIFO 9-1, the input FIFO 9-2 and the input FIFO 9-4 all have the synchronizing command, only the graphic data C(1) is selected. The same steps as explained above are repeated in the switch/selection unit 11 so that it is possible to easily designate the order of the pipeline processing.

The following example will be given for the case of a fault in the processor module. The synchronizing command according to the present invention is used as follows. These operations are explained in detail in FIG. 10.

Figure 7:
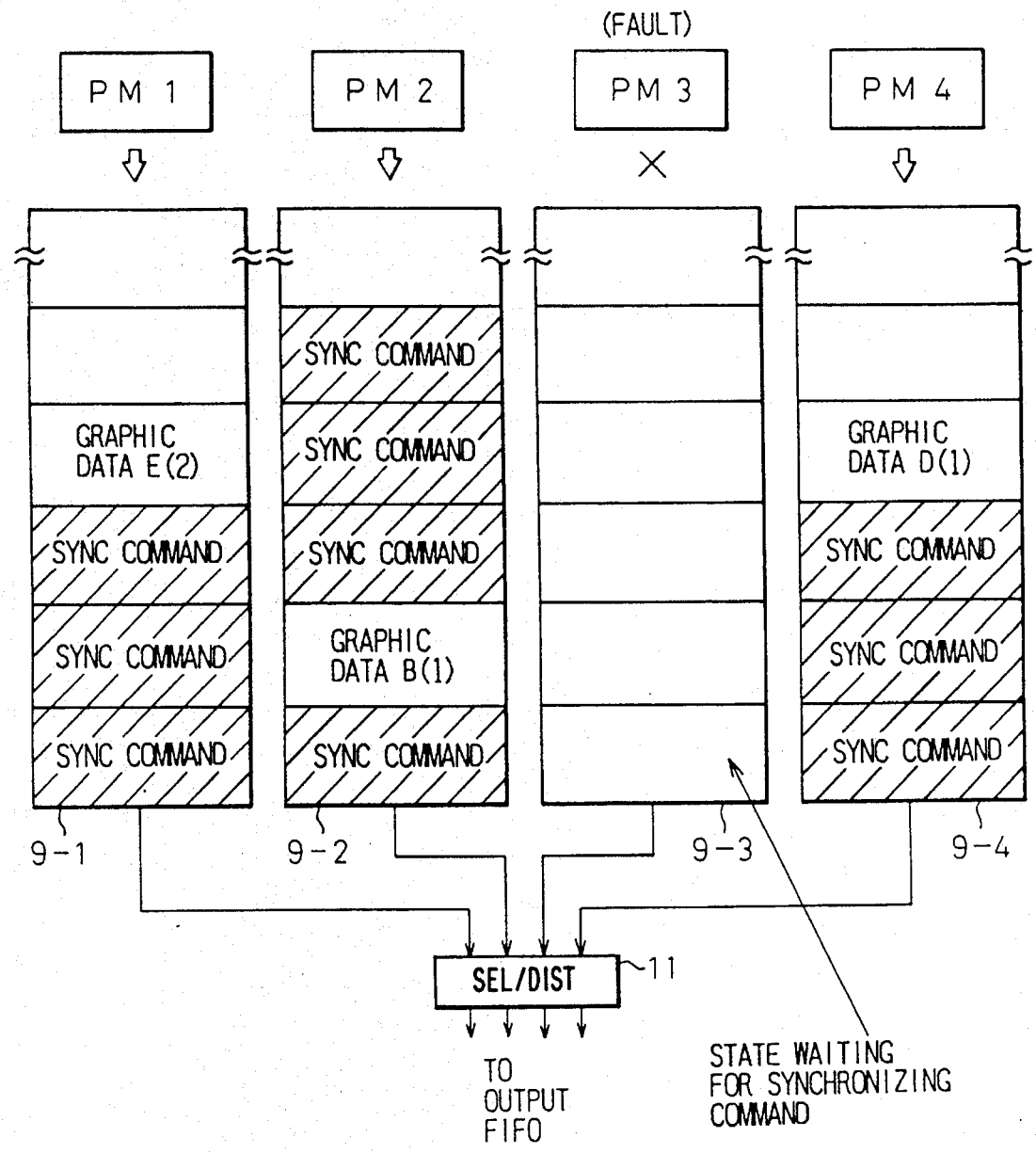
FIG. 7 is an explanatory view of a faulty processor modules.

FIG. 7 is an explanatory view of a faulty processor module. In this case, it is assumed that the processor module PM3 is defective. Accordingly, the input FIFO 9-3 enters a vacant state. The distributor waits for the synchronizing command from the processor module PM3. As a result of waiting, the apparatus enters a faulty state.

Figure 8:
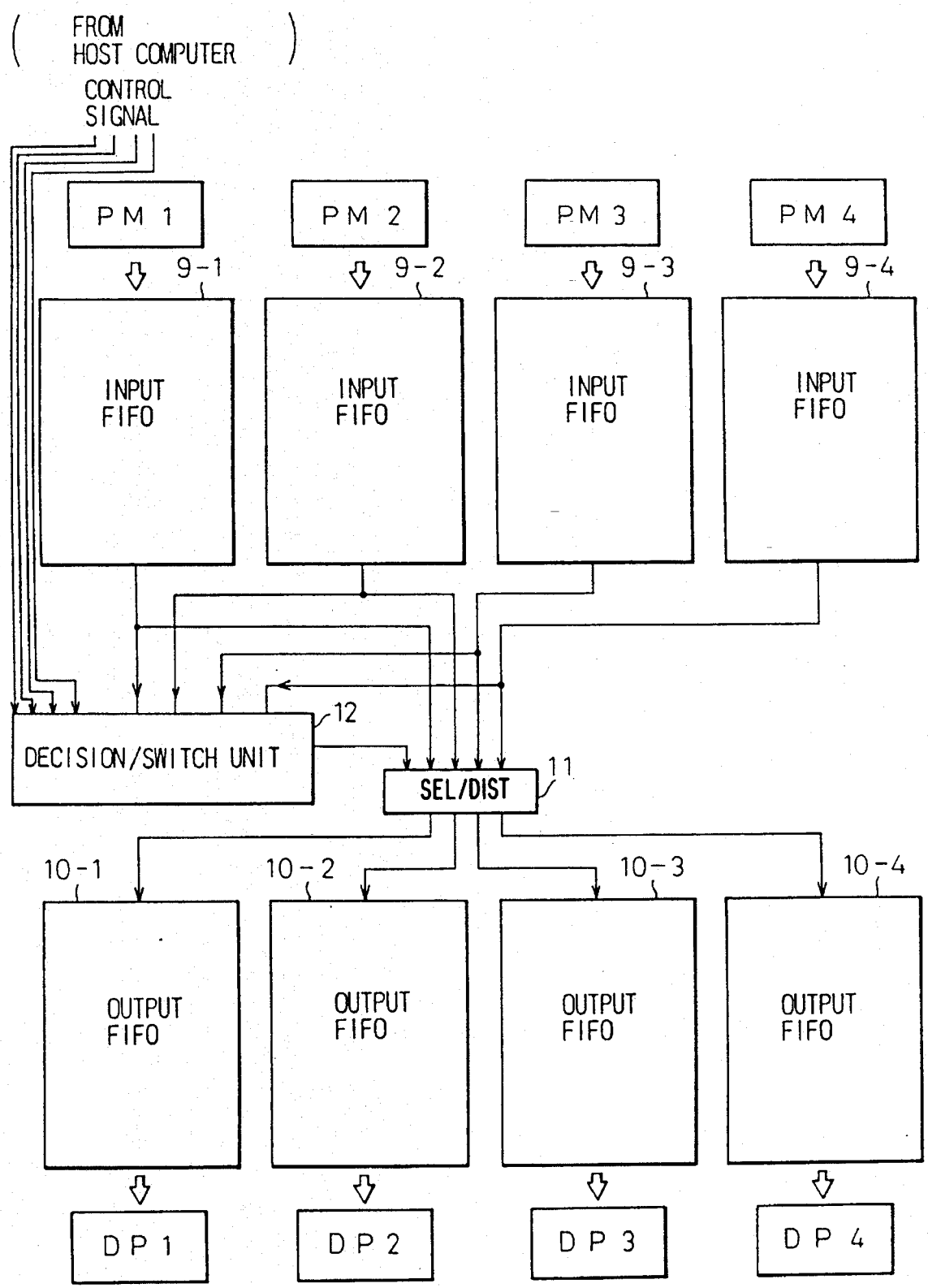
FIG. 8 is a schematic block diagram of a distributor according to another embodiment of the present invention.

FIG. 8 is a schematic block diagram of a distributor according to another embodiment of the present invention. In FIG. 8, reference number 12 denotes a decision/switch unit for the synchronizing command. The decision/switch unit 12 receives outputs of input FIFOs, and also receives control signals from the host computer. Further, the decision/switch unit 12 has a function to solve the problem caused by the fault of the processor module. The decision/switch unit 12 is formed by a plurality of units as shown in FIG. 10. This unit 12 receives control signals from the host computer (see, graphic data management unit in FIG. 11) and the inputs from the input FIFOs 9-1 to 9-4.

Further, the decision/switch unit 12 has a plurality of bits indicating states (i.e., normal or faulty) of a corresponding processor module. For example, the bit "1" is provided for the faulty processor module PM3 as explained in FIG. 10.

Figure 9:
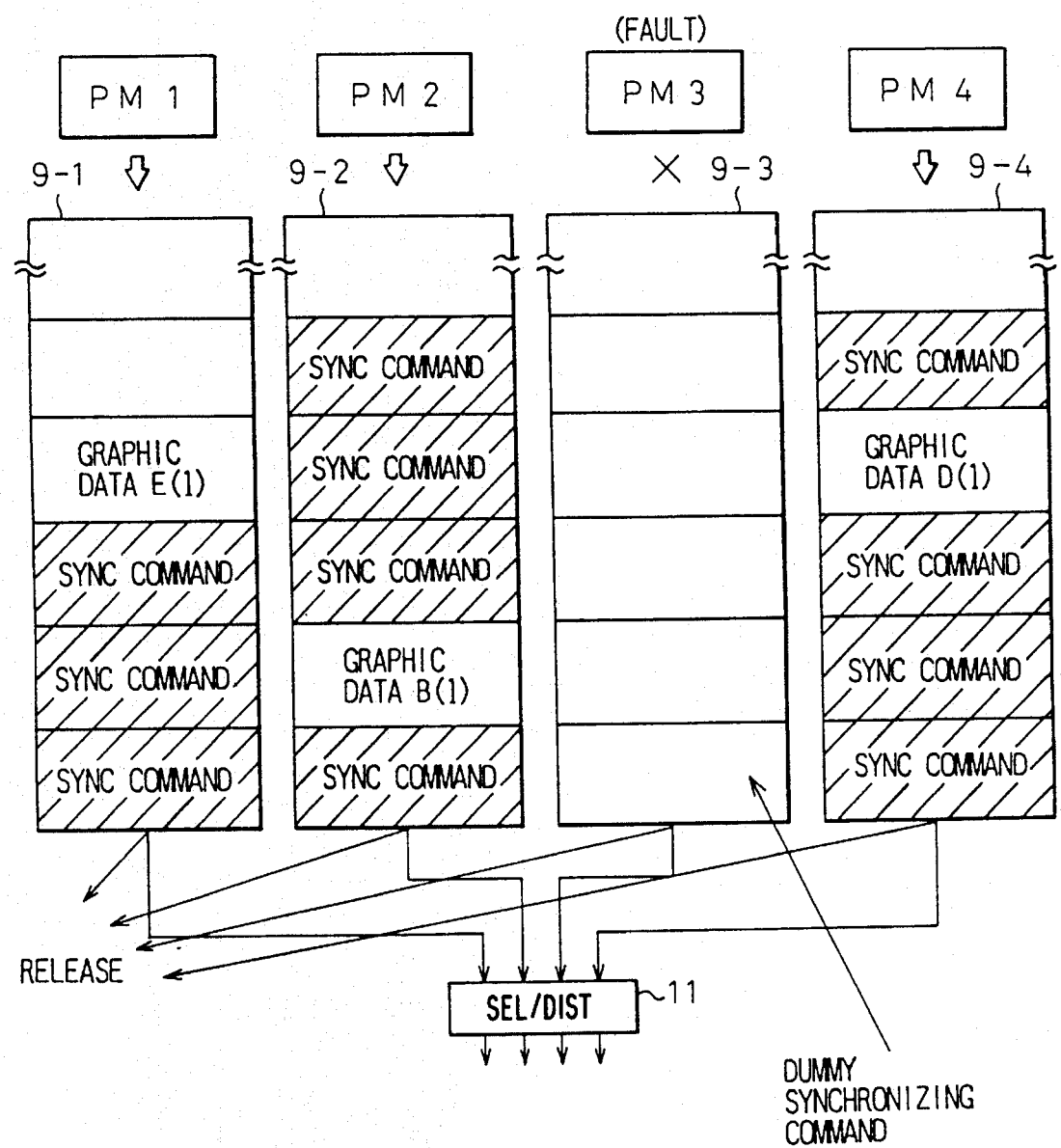
FIG. 9 is an explanatory view of operation of a faulty processor module.

FIG. 9 is an explanatory view of operation of the faulty processor module. In the present invention, it appears that the faulty processor module PM3 always generates the synchronizing command (this command is called a "dummy synchronizing command"). Accordingly, as shown in the drawing, when the other three modules have synchronizing commands, all synchronizing commands including the dummy synchronizing command are released. The operation of FIG. 9 is explained in detail in FIG. 10.

FIG. 10 is a detailed block diagram of the switch/selection unit 11 and the decision/switch unit 12 according to the present invention. In FIG. 10, reference number 13 denotes a multiplexer, reference number 14 denotes a destination selecting unit, reference number 15 denotes a synchronizing command decision unit, reference number 16 denotes a command analyzing unit, reference number 17 denotes an input selecting unit, reference number 18 denotes an output control unit, reference number 19 denotes an input data decision unit, and reference number 20 denotes a control register.

The switch/selection unit 11 includes the multiplexer 13 and the destination selecting unit 14.

The decision/switch unit 12 includes the synchronizing command decision unit 15, the command analyzing unit 16, the input selecting unit 17, the output control unit 18, and the input data decision unit 19.

The multiplexer 13 selectively outputs the input data from the input FIFOs 1 to 4 (corresponding to 9-1 to 9-4) in accordance with an input control signal ICS from the input selection unit 17. When selection is finished, the read pointer (not shown) of the selected input FIFO is incremented by +1.

The destination selecting unit 14 distributes the graphic data to one or more output FIFOs 1 to 4 (corresponding to 10-1 to 10-4) in accordance with a destination control signal DCS from the output control unit 18.

The synchronizing command decision unit 15 receives a synchronizing command SCS from the command analyzing unit 16 and the contents CS of the control register 20, and outputs a selection prohibiting signal SPS to the input selection unit 17. The decision unit 15 has a reception flag for the synchronizing command. This reception flag is provided for each processor module PM. The decision unit 15 receives a synchronizing command selecting signal and an input FIFO number, and sets the reception flag to "1".

The selection prohibiting signal SPS is formed by four bits corresponding to the control register 20. The selection prohibiting signal can be obtained by an OR operation between four reception signals and the contents of the control register 20. For example, when the contents of the control register 20 are given by "0010", and when the reception flags corresponding to the input FIFOs 9-1 to 9-4 are given by "1000", the selection prohibiting signal becomes "1010" as a result of the OR operation between the reception flags and the contents of the control register 20. When the selection prohibiting signal SPS becomes "1111", the decision circuit 15 clears all reception flags.

The command analyzing unit 16 analyzes the output of the multiplexer 13. When the command analyzing unit 16 detects the synchronizing command, it outputs the synchronizing command selecting signal SCS and the input FIFO number to the decision circuit 15.

The input selecting unit 17 selects one input based on the selection prohibiting signal SCS from the decision unit 15 and the result of the decision from the input data decision unit 19. For example, when the selection prohibiting signal SPS is given by "1000", the input selection unit 17 does not select the input FIFO 9-1. Further, when the result of the decision from the decision unit 19 indicates that the unit 19 cannot select the input FIFO 9-2, the input selection unit 17 does not select the input FIFO 9-2.

The output control unit 18 operates when the data from the multiplexer 13 represents the graphic data. Further, the output control unit 18 determines the output FIFO to be selected with reference to parameters of the graphic data, and generates and outputs the destination control signal DCS based on the decision.

The input data decision unit 19 determines the possibility of selection of the input. For example, when the input FIFO 9-1 is vacant, this input FIFO is eliminated as a candidate for selection.

The control register 20 stores bits each of which corresponds to the processor module. For example, when the processor module PM1 is not used (i.e., the input FIFO 9-1 becomes vacant), the first bit (1) of the control register 20 is set to "1". The contents (i.e., bits) of the register can be written by the host computer (i.e., graphic data management unit 1).

The operation of the units 11 and 12 is explained next in detail with reference to FIGS. 5 and 6. In FIGS. 5 and 6, for example, the priority order of the processor modules is given by PM2>PM3>PM4>PM1, and the content of the control register 20 is given by "0000".

First, the data of the input FIFO 9-2 is selected. Since this input data represents the synchronizing command, the reception flag corresponding to the input FIFO 9-2 is set to "1" and the selection prohibiting signal SPS becomes "0100". After this process, the selection of the input FIFO 9-2 is prohibited.

Next, the data of the input FIFO 9-3 is selected. Since this data also represents the synchronizing command, the reception flag corresponding to the input FIFO 9-3 is set to "1" and the selection prohibiting signal SPS becomes "0110". After this process, the selection of the input FIFO 9-3 is prohibited.

Further, the data of the input FIFO 9-4 is selected. Since this input data also represents the synchronizing command, the reception flag corresponding to the input FIFO 9-4 is set to "1" and the selection prohibiting signal SPS becomes "0111". After this process, the selection of the input FIFO 9-4 is prohibited.

Still further, the data of the input FIFO 9-1 is selected. Since this input data represents the graphic data A(1), this graphic data A(1) is written into the output FIFOs 10-1 to 10-3.

Next, since the selection prohibiting signal SPS is set to "0111", the input data of the input FIFO 9-1 is selected. Since this data represents the graphic data A(2), this graphic data A(2) is written into the output FIFOs 10-1 to 10-3.

Further, since the selection prohibiting signal SPS is set to "0111", the data of the input FIFO 9-1 is selected. Since this data represents the graphic data A(3), this graphic data A(3) is written into the output FIFO 9-4.

Still further, since the selection prohibiting signal SPS is set to "0111", the data of the input FIFO 9-1 is selected. In this case, since this data represents the synchronizing command, the reception flag corresponding to the input FIFO 9-1 is set to "1" so that the selection prohibiting signal is set to "1111".

Since all selection prohibiting signals SPS are set to "1" (i.e., "1111"), all reception flags are cleared so that the selection prohibiting signal SPS is set to "0000".

The operation of the circuits 11 and 12 is explained next in detail with reference to FIG. 9. In FIG. 9, for example, the priority order of the processor module is given by PM1>PM2>PM3>PM4, and the content of the control register 20 is given by "0010". As explained above, the processor module PM3 is faulty so that the dummy synchronizing command is provided for the input FIFO 9-3.

First, the data of the input FIFO 9-1 is selected. Since this data represents the synchronizing command, the reception flag corresponding to the input FIFO 9-1 is set to "1". Accordingly, the selection prohibiting signal SPS is set to "1010". After this selection, the selection of the input FIFO 9-1 is prohibited.

Next, the data of the input FIFO 9-2 is selected. Since this data also represents the synchronizing command, the reception flag corresponding to the input FIFO 9-2 is set to "1". Accordingly, the selection prohibiting signal SPS is set to "1110". After this selection, the selection of the input FIFO 9-2 is prohibited.

Next, since the dummy synchronizing command is provided for the input FIFO 9-3, the selection prohibiting signal SPS corresponding to the input FIFO 9-3 is set to "1" so that the data of the input FIFO 9-3 is not selected. Accordingly, the data of the input FIFO 9-4 is selected. Since this data is also the synchronizing command, the reception flag corresponding to the input FIFO 9-4 is set to "1". Accordingly, the selection prohibiting signal SPS is set to "1111", and after this selection, the selection of the input FIFO 9-4 is prohibited.

Since the selection prohibiting signal SPS is set to "1111" so that all bits are set to "1", all reception flags are cleared and the selection prohibiting signal SPS is returned to "0010".

Next, the data of the input FIFO 9-1 is selected. Since this data represents the synchronizing command, the reception flag corresponding to the input FIFO 9-1 is set to "1". Accordingly, the selection prohibiting signal SPS is set to "1010", and after this selection, the selection of the input FIFO 9-1 is prohibited.

Next, the data of the input FIFO 9-2 is selected. Since this data represents the graphic data B(1), the graphic data B(1) is sent to the output FIFO.

Since the selection prohibiting signal SPS corresponding to the input FIFO 9-3 is set to "1", the input FIFO 9-3 is not selected.

Next, the data of the input FIFO 9-4 is selected. Since this data represents the synchronizing command, the reception flag corresponding to the input FIFO 9-4 is set to "1". Accordingly, the selection prohibiting signal SPS becomes "1011" and, after this selection, the selection of the input FIFO 9-4 is prohibited.

Further, the data of the input FIFO 9-2 is selected. Since this data represents the synchronizing command, the reception flag corresponding to the input FIFO 9-2 is set to "1". Accordingly, the selection prohibiting signal SPS becomes "1111", and after this selection, the selection of the input FIFO 9-2 is prohibited.

Since the selection prohibiting signal SPS is set to "1111" and all bits thereof become "1", all reception flags are cleared, and the selection prohibiting signal SPS is set to "0010". The same operation is repeated for all input FIFOs (i.e., all processor modules).

FIG. 11 is a schematic block diagram of a three-dimensional computer graphic apparatus using the present invention. In FIG. 1, reference number 11 denotes a graphic data managing unit formed by, for example, a central processing unit (CPU), reference number 2 denotes a graphic data memory, reference number 3 denotes a data selecting unit, and PM1 to PMn denote processor modules. Further, reference number 4 denotes a distributor, DP1 to DPn denote drawing processors, reference numbers 5-1 to 5-n denote Z-buffers respectively connected to the drawing processors DP1 to DPn, reference numbers 6-1 to 6-n denote frame buffers respectively connected to the drawing processors DP1 to DPn, reference number 7 denotes a digital-to-analog (D/A) converter, and reference number 8 denotes a display unit used a monitor.

Further, each of the processor modules is formed by a geometric conversion unit and a pre-drawing processing unit. Each of the drawing processors DP1 to DPn corresponds to a partial area of an image displayed on the monitor 8 to carry out image processing. Assuming that two drawing processors are provided in the apparatus, the image on the monitor is divided into two areas.

As mentioned above, a plurality of multiprocessors are provided to carry out pipeline processing so that it is possible to achieve high speed image processing. Further, a plurality of pipeline processing operations are carried out in parallel for realizing further high speed image processing.

According to the present invention, in the pipeline processing using a plurality of processors, it is possible to easily designate the processing order of graphic data by using the synchronizing command so that it is possible to realize high speed graphic processing.

Further, according to the second aspect of the present invention, it is possible to easily designate a processor module which is not in use since the dummy synchronizing command is used when a processor module is faulty.

I claim:

1. A three-dimensional computer graphic apparatus which processes graphic data, comprising:
    a central processing unit functioning as a graphic data managing unit;
    a plurality of processor modules operatively connected to the central processing unit and each performing geometric conversion and a pre-drawing process on the graphic data and, further, outputting a synchronizing command;
    a distributor operatively connected to the processor modules;
    a plurality of drawing processors operatively connected to the distributor and each performing a drawing process based on the graphic data; and
    a monitor, operatively connected to the drawing processors, displaying the graphic data;
    said distributor further comprising:
        a plurality of input first-in first-out buffers, each connected to a corresponding processor module, sequentially storing data comprising graphic data and a synchronizing command, both output from the processor module,
        a plurality of output first-in first-out buffers, each connected to a corresponding drawing processor, sequentially storing the graphic data, and
        selection distributing means, provided between the input FIFOs and output FIFOs, for selecting the data from one of the input FIFOS, outputting the graphic data to the output FIFO when the selected data represents the graphic data, prohibiting selection of the data from a corresponding input FIFO after the above selection when the selected data represents the synchronizing command, and releasing prohibition of selection by the synchronizing command when all input FIFOs enter a state in which selection is prohibited.

2. A three-dimensional computer graphic apparatus as claimed in claim 1, wherein said selection distributing means comprises:
    a switch/selection unit having a multiplexer for selectively outputting the data from the input FIFOs and a destination selection unit for distributing the graphic data to one or more output FIFO; and
    a decision/switch unit having a synchronizing command decision unit for outputting a selection prohibiting signal based on a control signal from the CPU, a command analyzing unit for outputting the synchronizing command to the decision unit, an input selecting unit for receiving the selection prohibiting signal and outputting input control signal to the multiplexer, an output control unit for receiving the data from the multiplexer and outputting a destination control signal to the destination selecting unit, and an input data decision unit for receiving the data from the input FIFOs.

3. A three-dimensional computer graphic apparatus as claimed in claim 2, wherein said decision/switch unit further comprises:
    a control register provided between the CPU and the decision unit for storing bits, each bit indicating an in-use/not in-use state of the processor module; and
    the decision unit generates the selection prohibiting signal when receiving a "not in-use" signal sent from the control register to the input selecting unit.

4. A three-dimensional computer graphic apparatus as claimed in claim 3, wherein:
    said control register has a number of bits corresponding to the number of processor modules.

5. A three-dimensional computer graphic apparatus as claimed in claim 3, wherein:
    an "in-use" state is indicated by the bit "0" and a "not in-use" state is indicated by the bit "1".

6. A three-dimensional computer graphic apparatus as claimed in claim 1, wherein:
    when one of the processor modules becomes faulty, the distributor means appears to output a dummy synchronizing command from the faulty processor module.

* * * * *

UNITED STATES PATENT AND TRADEMARK OFFICE
CERTIFICATE OF CORRECTION

PATENT NO.  : 5,473,750
DATED       : Dec. 5, 1995
INVENTOR(S) : HATTORI

It is certified that error appears in the above-indentified patent and that said Letters Patent is hereby corrected as shown below:

Col. 3,   line 17, change "modules" to --module--.

Col. 7,   line 44, change "10-5" to --10-3--; and after "respectively" insert --,--.

Col. 9,   line 37, after "bits" insert --,--.

Col. 11,  line 22, change "In FIG. 1, reference number 11" to --In FIG. 11, reference number 1--.

Signed and Sealed this

Twenty-eighth Day of May, 1996

Attest:

BRUCE LEHMAN

*Attesting Officer*            *Commissioner of Patents and Trademarks*